UNITED STATES PATENT OFFICE.

JOHN FARREL, OF NEW YORK, N. Y.

IMPROVEMENT IN FIRE-PROOF SAFES.

Specification forming part of Letters Patent No. 46,228, dated February 7, 1865.

*To all whom it may concern:*

Be it known that I, JOHN FARREL, of the city, county, and State of New York, have invented a new and useful Improvement in Fire-Proof Safes; and I do hereby declare that the following is a full, clear, and exact description thereof.

Fire-proof safes have for some years past been made double, with what is termed the "fire-proof chamber" filled in with calcined sulphate of lime, commonly termed "plaster-of-paris," pulverized and mixed with water, as usually prepared for plastering walls. This substance, in drying, absorbs the water and becomes a hydrate, and when a safe afterward so prepared becomes exposed to the intense heat of a fire the water which has been taken up by the plaster is driven out in the form of vapor, and until it is all driven out the inside of the safe is thereby prevented from becoming heated to a temperature which would ignite the contents of the safe. Experience has established that this preparation gives out moisture at the ordinary temperature of the atmosphere, which has the effect of corroding the metal of which the safe is constructed and of rendering the inside of the safe damp, thereby exposing papers and other articles to mold and mildew.

The defect above stated induced me to institute experiments with the view to discover some substance or preparation which would be as effective in giving protection against the injurious action of high temperatures, such as safes are exposed to in the burning of buildings, and which at the same time would not give out the water of crystallization at the ordinary temperatures to which such structures are exposed in daily use, and I finally discovered that Epsom salts possess the requisite property.

In the mode of application of my said invention which I have practiced with success I take one part of sulphate of magnesia, commonly called "Epsom salts," and two parts of sulphate of lime, not calcined. I pulverize these and thoroughly mix them in the dry state and with this mixture fill in the fire-proof chamber of the safe—that is, the space between the outer and the inner shells of the safe—constructed in the usual or any appropriate manner, taking care to pack in the material so as to entirely fill up the space. The space so filled should be from three to six inches in thickness, more or less. The safe so prepared will be proof against fire, and the preparation used in the fire-proof chamber thereof will not give out moisture at any temperature to which such structures are exposed, except in case of fire, and will not therefore corrode the metal or moisten or mildew papers and other articles put in the safe for safety. This material will not lose its fire-proof property by age, and when exposed to high temperatures—such as are produced by a burning building—it will fuse into a hard mass that will not decrepitate.

Although I have above stated that I mix the sulphate of magnesia with sulphate of lime, I do not wish to be understood as limiting my claim of invention to such mixture, as the important property above pointed out is due to the presence of the sulphate of magnesia, which may be used alone or in admixture with sulphate of lime or other substance having like properties, the sulphate of lime being introduced as a matter of economy, I having discovered that when used with the sulphate of magnesia the giving out of moisture at the ordinary temperatures of the atmosphere is effectually prevented.

What I claim as my invention is—

The employment of sulphate of magnesia in filling in the fire-proof chamber of safes, chests, and other like structures, when prepared and put in substantially as and for the purpose specified.

JOHN FARREL.

Witnesses:
WM. H. BISHOP,
ANDREW I. TODD.